United States Patent [19]
Bolen et al.

[11] Patent Number: 6,012,935
[45] Date of Patent: Jan. 11, 2000

[54] CLOCKSPRING CONNECTOR WITH CARRIER MEMBER

[75] Inventors: Patrick Bolen, Carthage; Gary Best, Hamilton, both of Ill.

[73] Assignee: Methode Electronics, Inc., Chicago, Ill.

[21] Appl. No.: 09/107,108

[22] Filed: Jun. 30, 1998

Related U.S. Application Data

[63] Continuation-in-part of application No. 08/986,866, Dec. 8, 1997, which is a continuation-in-part of application No. 08/667,634, Jun. 24, 1996, Pat. No. 5,865,634, which is a continuation of application No. 08/276,954, Sep. 19, 1994, abandoned.

[51] Int. Cl.[7] .................................................. H01R 35/04
[52] U.S. Cl. .............................................. 439/164; 439/15
[58] Field of Search ........................................ 439/164, 15

[56] References Cited

U.S. PATENT DOCUMENTS

| | | |
|---|---|---|
| 3,763,455 | 10/1973 | Confer et al. . |
| 4,502,746 | 3/1985 | Wawra et al. . |
| 4,540,223 | 9/1985 | Schmerda et al. . |
| 4,744,763 | 5/1988 | Suzuki et al. ............................... 439/15 |
| 4,925,122 | 5/1990 | Bannai ....................................... 262/85 |
| 4,978,191 | 12/1990 | Hasegawa et al. ..................... 350/96.2 |
| 5,046,951 | 9/1991 | Suzuki ....................................... 439/15 |
| 5,066,239 | 11/1991 | Bannai et al. ........................... 439/164 |
| 5,082,451 | 1/1992 | Bannai et al. ........................... 439/164 |
| 5,102,061 | 4/1992 | Suzuki et al. .......................... 242/54 R |
| 5,224,871 | 7/1993 | Ida et al. ................................. 439/164 |
| 5,277,604 | 1/1994 | Ida et al. ................................. 439/164 |
| 5,429,517 | 7/1995 | Bolen ..................................... 439/164 |
| 5,460,535 | 10/1995 | Bolen ....................................... 439/15 |
| 5,487,667 | 1/1996 | Bolen ..................................... 439/164 |
| 5,490,793 | 2/1996 | Bolen ..................................... 439/164 |
| 5,580,259 | 12/1996 | Bolen et al. ............................. 439/164 |
| 5,601,437 | 2/1997 | Harvey et al. ............................ 439/15 |
| 5,888,084 | 3/1999 | Mukai et al. ........................... 439/164 |

*Primary Examiner*—Gary F. Paumen
*Attorney, Agent, or Firm*—Karl D. Kovach, Esq.; David L. Newman, Esq.

[57] ABSTRACT

A clockspring connector is provided comprising a housing defining a chamber, including a carrier member having a first roller associated with a first turned-back loop of a first flat conductor cable and a second roller associated with a second turned-back loop of a second flat conductor cable wherein said first and second flat conductor cables are alternatingly coiled at an inner diameter of the chamber adjacent the hub or along said outer diameter of the chamber adjacent the housing wall. The clockspring connector includes a complaint roller member providing compression forces against the flat ribbon cable during rotation of the clockspring connector. A clockspring connector and method for producing the same is provided having a hub rotatably mounted within a housing, the housing defining a chamber, with an integrated carrier assembly mounted within the housing, the integrated carrier assembly having a frame with a first and second roller assembly, wherein the integrated carrier assembly includes a first and second flat ribbon cable each having a slack length that encircles and variably distributes within the housing, wherein a first and second conductive backbone is accessible to the first and second flat ribbon cable and the first backbone interconnects with the steering system to circle with the base upon rotation of the steering wheel, the first and second backbones being interconnected by the flat ribbon cables.

5 Claims, 6 Drawing Sheets

CLOCKSPRING CONNECTOR WITH CARRIER MEMBER

This application is a continuation-in-part of U.S. Ser. No. 08/986,866, filed Dec. 8, 1997, which is a continuation-in-part of U.S. Ser. No. 08/667,634 filed Jun. 24, 1996 is now U.S. Pat. No. 5,865,634, which is a continuation of U.S. Ser. No. 08/276,954 filed Sep. 19, 1994, now abandoned. The aforementioned parent applications are incorporated herein by reference.

BACKGROUND OF THE INVENTION

This invention pertains to a clockspring connector for enclosing electrical conductor cables, the clockspring connector electrically connecting a rotatable electric device with a stationary electric device.

While the present invention may have multiple applications, the most prevalent is for use in automobiles. An increasing number of automobiles have airbag crash systems. An airbag is typically located on the steering wheel facing the driver. The airbag must be in continuous electrical connection with sensors in the car body. The sensors provide an electrical signal to the airbag crash assembly which instantly inflates the airbag in the event of a crash. Accordingly, there is a need for an electrical connection between the rotatable portion of the airbag assembly which is mounted to the steering wheel, and the remaining portion of the assembly which is in a stationary position in the car body. Electrical connections between rotatable and stationary parts are well known. Typically, an electrical brush rests upon a conductive ring, with one of the parts being rotatable to provide such rotatable electrical connection. However, there is a risk, particularly during the impact of an accident, of a transient failure of electrical connection with a brush and ring system which result in failure of the entire airbag system crash assembly.

Accordingly, a clockspring connector has previously been developed, comprising an outer housing, a rotor member and a multiple of intermediate housing members for enclosing and connecting the members; the housing and rotor member rotatably associated with one another at a plurality of bearing surfaces. A "clockspring" is located inside the interconnector. The clockspring of prior art devices includes a single flat conductor cable having its ends conductively attached to conductor wires which pass out of the interconnector to unite the airbag to the sensing device. For example, U.S. Pat. No. 5,061,195 discloses a clockspring housing and assembly having a single flat conductor cable therein.

It has also been known in the art to reduce the length of the flat conductor cable in order to reduce cost and needed space within the clockspring housing. For example, U.S. Pat. No. 5,277,604 incorporates an assembly of at least eight rollers and turned-back portions of the flat conductor cable within the clockspring housing to decrease the length of the flat cable and also prevent buckling and enhance reliability and smooth rotation of the clockspring connector. Such a design requires a complex and expensive system of mounting the rollers. Such a design may be expensive and, as well, only accommodates a single flat conductor cable.

The use of a pair of conductor cables was disclosed in U.S. Pat. No. 3,763,455. The conductor cables were carried by an assembly of twenty spacers or rollers. This design also requires a multiplicity of parts, including numerous rollers which add to the assembly time and costs of the device.

As more controls are mounted on the steering wheel, more conductors are required to pass multiple electrical signals through the clockspring connector. Prior art clocksprings have included conductor cables having up to six conductors in each flat cable. The excess of six conductors is limited by the limited width of the flat conductor cable and the processing methods of manufacturing the flat cable. Accordingly, there is needed a clockspring connector which can accommodate more than six conductors.

Still further, assembling clocksprings is a laborious and costly process that is prone to error. In particular, the known art requires that the clockspring be assembled from an assortment of components that guide flat ribbon cables in sync with the rotation of the steering wheel. Assembling the various components individually into a clockspring is a tedious and labor intensive process. It is therefore an object of the invention to provide for a clockspring that may readily be assembled and manufactured.

It is still another object of the invention to provide for an integrated carrier assembly having a frame and which easily assembles within a steering wheel.

It is another object of the present invention to provide a clockspring connector having a minimal amount of moving parts.

It is a further object of the present invention to provide a clockspring connector having flat conductor cable of minimal length.

It is another object of the present invention to provide a clockspring having a freely and independently rotating carrier member.

It is a further object of the present invention to provide a clockspring connector that reduces vibration of the flat conductor cable by use of a compliant roller member.

SUMMARY OF THE INVENTION

The above objects and advantages are provided by a clockspring connector comprising a housing defining a chamber extending therethrough. A carrier member positioned within the chamber having a complaint rollers. Flat conductor cable carried by the carrier member. The flat conductor cable having a first turned-back loop section associated with a first roller and a second turned-back loop section associated with a second roller. A first flat cable associated with the first roller and a second flat cable associated with the second roller. A hub having an inner diameter exit cavity for receiving the flat conductor cable. Whereupon rotation of the hub in a clockwise direction causes the first flat conductor cable to unwind from the hub and push against the carrier wall adjacent the first roller and simultaneously the second flat cable unwinds off of the hub and pushes against the second wall of the carrier member adjacent the second roller causing the carrier member to rotate in a clockwise direction and to transfer the first and second flat cables from the hub to the outer diameter of the housing. Rotation of the hub in the counterclockwise direction causes the first flat cable to pull on the first roller and the second flat cable to pull on the second roller causing the first and second flat cables to unwind from the outer diameter of the chamber and simultaneously causing the carrier member to rotate in a counterclockwise direction.

A housing member receives the hub, the carrier member is mounted on the hub, and a cover encloses the carrier member and flat cables within the housing. The cover having an outer diameter exit cavity.

In an alternative embodiment of the invention, the clockspring provides for the housing to include an integrated carrier assembly rotatably mounted thereto. The housing itself includes a fixed cover and a base that define a chamber. The integrated carrier assembly preferably comprises a frame having one or more rollers that rotate independently. Within the housing, an inner diameter region is concentrically defined by a hub and the frame, and an outer diameter region is concentrically defined by the frame and the housing. The first and second flat ribbon cable are variably distributed to encircle the hub along either the inner or outer diameter regions. The flat ribbon cables pass and turn-back through the rollers of the frame, so that the portions of each flat ribbon cables located in the inner and outer diameter regions move in opposite directions. At the turn-back each flat ribbon cable has a concave surface facing one roller and a convex surface, opposite the concave surface, facing the other roller. Each flat ribbon cable includes a slack length that passes through a corresponding roller or roller pair to vary the distribution of the flat ribbon cable between the inner and outer diameter. The first and second flat ribbon cables interconnect to an inner backbone, as incorporated by previous embodiments, that is received by the base and accessible to each flat ribbon cable from the inner diameter region. An outer backbone is also accessible to each flat ribbon cable along the outer diameter region, such that the flat ribbon cables may interconnect the inner and outer backbone within the clockspring. In this way, rotation of the inner backbone causes the flat ribbon cables to contact and rotate the integrated carrier assembly. In particular, the slack length of each flat ribbon cable may contact a roller and rotate the integrated carrier assembly in conjunction with the intake or outtake of flat ribbon cable. Preferably, the slack length of each flat ribbon cable may contact one or the other roller forming a roller pair that receives each flat ribbon cable, thereby forcing the integrated carrier assembly to rotate in either the clockwise or counterclockwise direction.

These and other features of the invention are set forth below in the following detailed description of the presently preferred embodiments.

DETAILED DESCRIPTION OF THE PRESENTLY PREFERRED EMBODIMENTS

Figure 1:
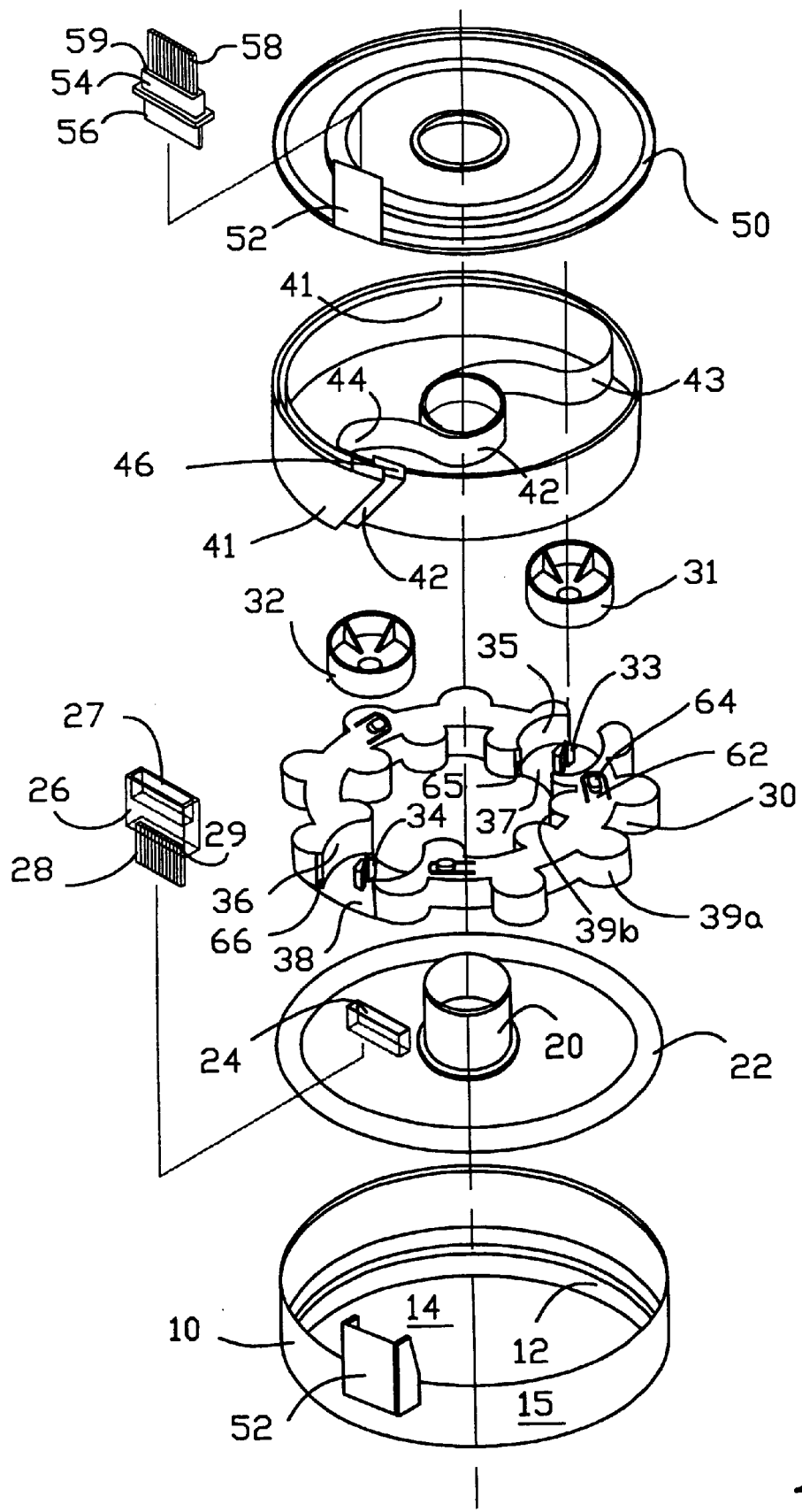
FIG. 1 is an exploded perspective view of a clockspring connector.
Figure 2:
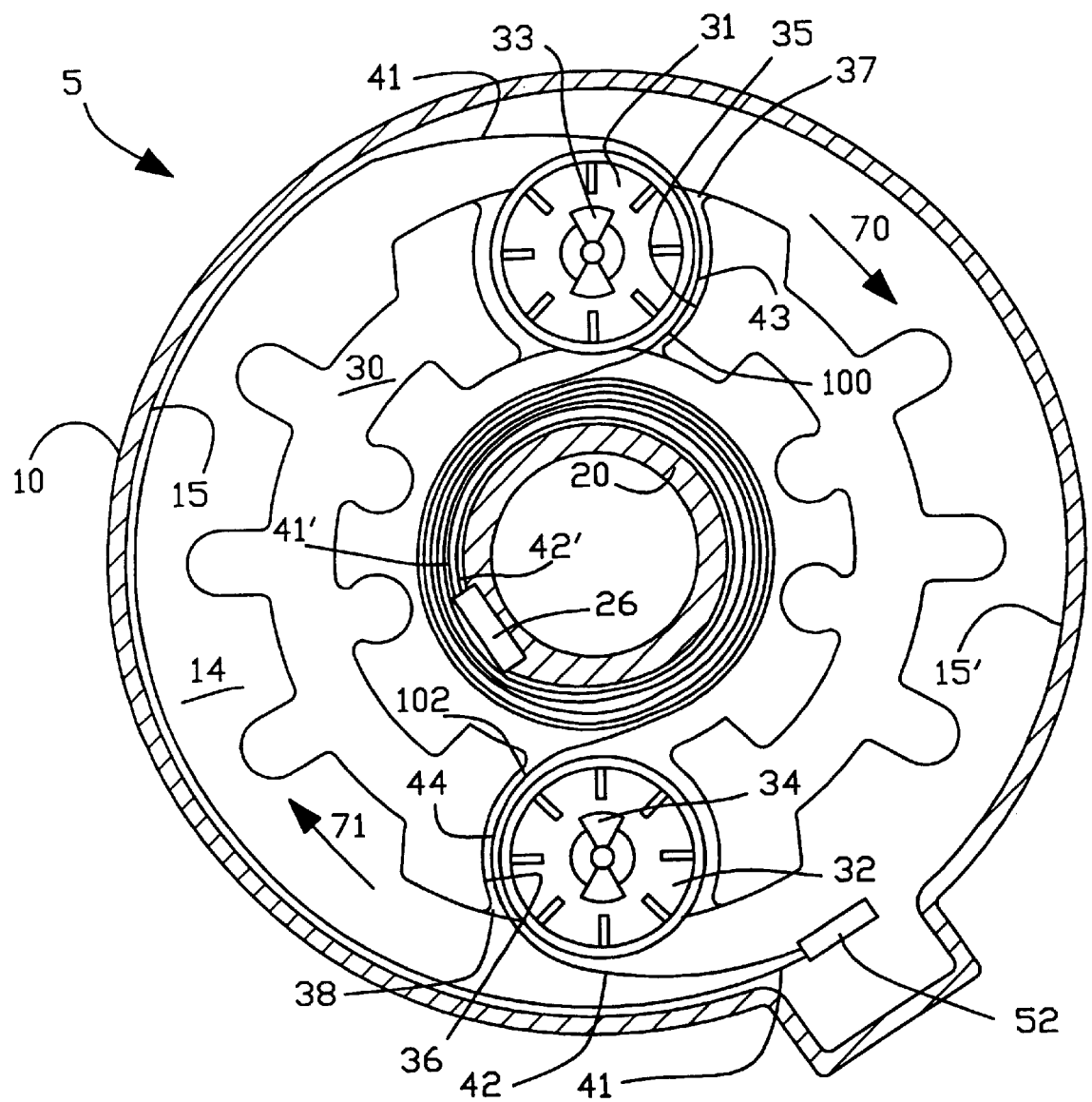
FIG. 2 is a top view of a clockspring connector in a fully wound position.
Figure 3:
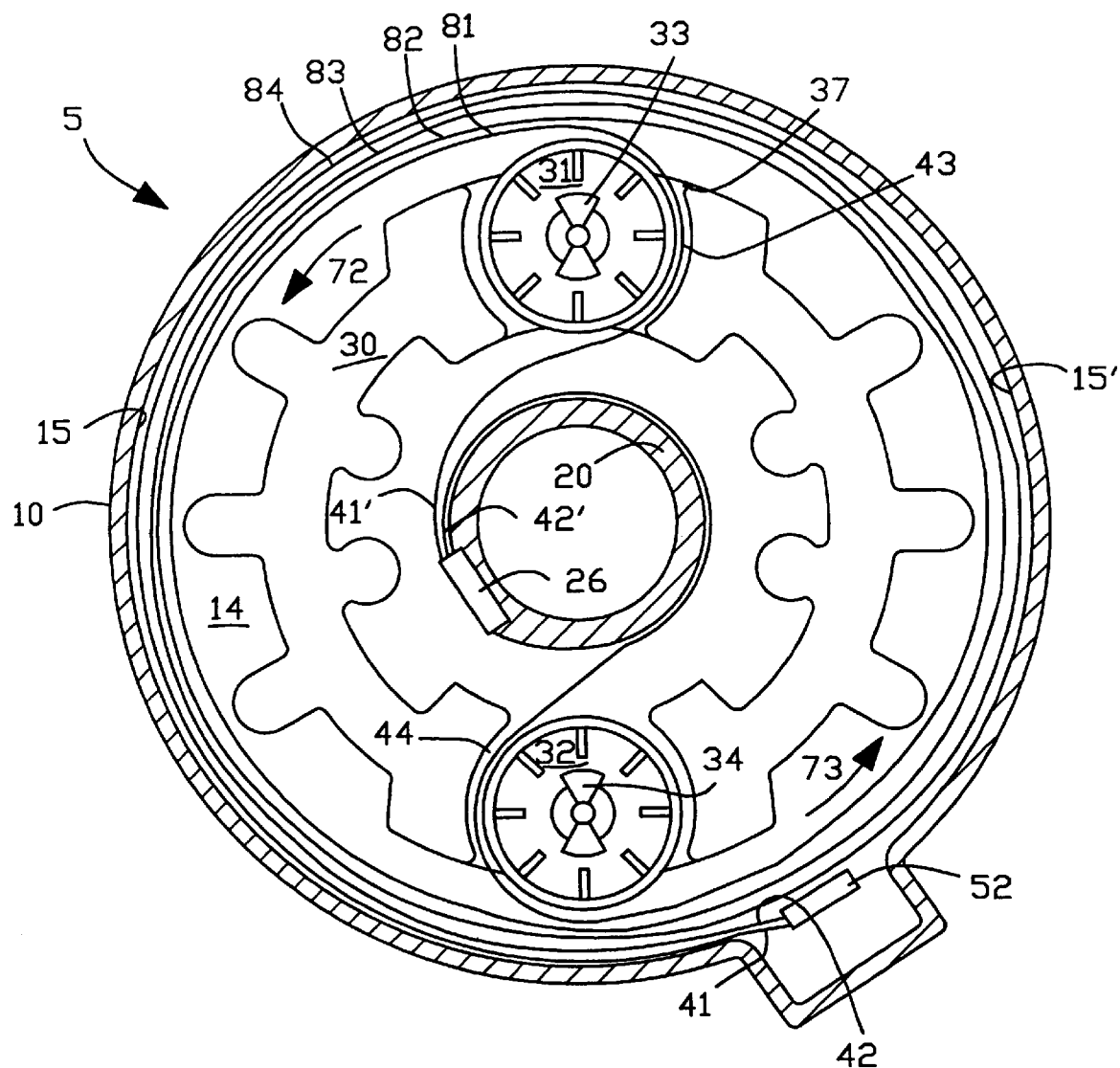
FIG. 3 is a top view of clockspring connector in a fully unwound position.

The clockspring connector of this invention is better understood by references to FIGS. 1–3 which show various aspects of a presently preferred clockspring connector. Turning to FIG. 1, a housing 10 receives a hub 20. Mounted on the hub is a carrier member 30. A first flat conductor cable 41 and a second flat conductor cable 42 is carried by the carrier member 30. A cover 50 encloses the flat ribbon cables 41,42, carrier member 30 and hub 20 within housing 10.

The housing 10 includes a ledge 12 upon which the base 22 of hub 20 rests. The hub 20 and housing 10 are constructed of materials which allow the hub 20 to freely rotate within the housing 10 and to reduce the amount of friction between the base 22 and ledge 12 to the greatest extent. Materials such as a teflon tape, silicon material or grease may be inserted between the base 22 and ledge 12 in order to reduce friction at these bearing surfaces and all other bearing surfaces of the present invention. An inner diameter exit cavity 24 protrudes downwardly from the base 22 of hub 20. Inserted within the inner diameter exit cavity 24 is inner diameter backbone 26. The inner diameter backbone 26 receives flat conductor cable at its entrance end 27 and insulated wires 28 protrude from the exit end 29.

Mounted on the hub 20 and freely and independently rotatable thereon is carrier member 30. The carrier member 30 is generally a spherically shaped member being molded of a thermoplastic polymer material in the presently preferred embodiment. However, any material may be used to form the carrier member 30. The carrier member 30 includes a first roller mounting area 37 and a second roller mounting area 38. Axles 33,34 protrude upwardly from the roller mounting areas 37,38, respectively. Roller area walls 35,36 surround the roller areas 37,38 and are correspondingly shaped to the outer diameter of first roller 31 and second roller 32. Inner diameter corner 65 and outer diameter corner 66 are located at each end of roller area walls 35,36. The total circumference of roller area walls 35,36 may be controlled by changing the shape of corners 65,66 in order to control the path of the conductor cables 41,42. By rounding corners 65,66, the circumference of walls 35,36 is reduced and the area which contacts the conductor cables 41,42 is also reduced. By extending and bringing corners 65,66 to a point, the circumference of walls 35,36 is increased which increases the surface area which contacts conductor cables 41,42.

First roller 31 is mounted on axle 33 and second roller 32 is mounted on axle 34 of the carrier member 30. The first and second rollers 31,32 rotate freely and independently on their axles 33,34. A multiplicity of nubs 39a and 39b protrude from around the carrier member 30 toward the hub 20 or housing wall 15 and provide a surface against which the conductor cables 41,42 may rub and rotate against. The carrier member 30 provides a member for mounting rollers 31,32 and separating the conductor cables 41,42 along the outer diameter of the chamber 14 from the conductor cables 41,42 at inner diameter of the chamber 14. Spring members 62 are molded into the carrier member 30. Spacers 64 protrude from spring members 62 and help to keep the carrier member 30 positioned axially within the clockspring housing chamber 14. The housing chamber 14 is defined by the housing wall 15 around the circumference of the housing 10. The chamber 14 is further defined by the hub base 22 at its bottom and cover 50 at the top.

The present invention includes two flat conductor cables. A first conductor cable 41 and second conductor cable 42 are adjacently coiled around carrier member 30 within chamber 14 of the housing 10. The flat ribbon cables 41,42 of a preferred embodiment of this invention are formed by laminating six conductors parallel to each other with a pair of insulating films one each side. The use of two flat ribbon cables 41,42 having six conductors each provides for a total of twelve conductors carried by the preferred embodiment of this invention. It is within the scope of the present invention that more than two conductor cables could be carried by the present embodiment in order to increase the number of conductors to an almost limitless combination. The first conductor cable 41 includes first turned-back U-shaped loop section 43 and second conductor cable 42 includes second turned-back U-shaped loop section 44. First and second conductor cables 41,42 exit the clockspring at the outer diameter through the outer diameter exit cavity 52. Conductor cable tails 46 are folded perpendicularly to the path of the conductor cables within the chamber 14 and are received by the outer diameter exit cavity 52. Outer diameter backbone 54 is received from the other end of the outer diameter exit cavity 52 from the conductor cable tails 46. Entrance cavity 56 of the outer diameter backbone 54 receives the first and second conductor cables 41,42. The conductors of the cables 41,42 are welded to the corresponding insulated wires 58 which protrude from the exit end 59 of outer diameter backbone 54.

Assembly of the clockspring connector having the hub 20 adjacent the housing 10 occurs in order to allow for the easiest and quickest possible assembly of the clockspring connector. While the hub 20 includes the exit cavity 24 at the inner diameter, the hub 20 is the rotatable member which is associated with the steering wheel of an automobile. Rotation of the steering wheel of the automobile simultaneously rotates the hub 20. The cover 50 having exit cavity 52 at its outer diameter is placed onto the housing 10 and is the stationary member of the clockspring connector. The exit cavity 52 at the outer diameter is associated with the steering column of an automobile and is stationary. Thus, although FIG. 1 shows assembly of the clockspring connector having the inner diameter exit cavity 24 on the bottom and the outer diameter cavity 52 at the top of the assembly; when the clockspring connector is assembled to a steering assembly, it will be inverted so that the inner diameter exit cavity 24 and hub 20 are on the top of the clockspring connector and the outer diameter exit cavity 52 and cover 50 are on the bottom of the clockspring connector.

Operation of the clockspring can more easily be understood by viewing FIG. 2. The housing 10 has mounted therein carrier member 30 and hub 20. Mounted on the carrier member 30 is first roller 31 and second roller 32. The clockspring connector is shown in the fully wound position having the majority of the conductor cables 41,42 coiled around the hub 20 at the inner diameter of the chamber 14. First roller 31 is mounted in roller area 37 on axle 33 of the carrier member 30. Second roller 32 is mounted in second roller area 38 on axle 34 of the carrier member 30. First conductor cable 41 exits the outer diameter backbone 54 and coils adjacent to the outer diameter wall 15 of the housing 10. First turned-back loop section 43 then coils around first roller 31 and then coils around the hub 20. Second flat conductor cable 42 exits the outer diameter backbone 52 and at second turned-back loop 44, coils around second roller 32 and then onto hub 20 from the opposite side, 180° from the position where the first conductor cable 41 coils onto the hub 20. First conductor cable 41' terminates at the inner diameter backbone 26, adjacent second flat conductor cable 42'.

The rotational movement of the steering wheel is transmitted to the clockspring connector through the hub 20 and inner diameter backbone 26. Rotation in the clockwise direction or in direction of arrows 70,71 causes the first flat conductor cable 41 to unwind off of hub 20 and move to the right at position 100 and rub against wall 35 of the first roller area 37 of the carrier member 30. Simultaneously, second flat conductor cable 42 unwinds from hub 20 at point 102 and protrudes and rubs against wall 36 of second roller area 38 of carrier member 30. As the hub continues to unwind in the clockwise direction, the conductor cables 41,42 push against walls 35,36 and force the carrier member 30 also to rotate clockwise. As the hub 20 and carrier member 30 rotate clockwise, the first flat conductor cable 41 is spooled out from first roller 31 to completely encircle the outer diameter of the chamber 14 adjacent the wall 15 of the housing 10. Simultaneously, the second flat conductor 42 is spooled out along second roller 32 at a position 180° from the first conductor cable 41, to provide a second coil layered adjacently to the first conductor cable 41 at the outer diameter of the chamber 14. Rotation of the hub and carrier member 30 continue in the clockwise direction until the flat cables 41,42 are completely unwound from the hub 10.

The completely unwound condition is shown in FIG. 3. Like numerals for like elements of FIG. 2 are shown in FIG. 3. The clockspring connector 5 is shown in a completely unwound position, i.e., the flat conductor cables 41,42 are not coiled around hub 20. To wind the clockspring connector, the hub 20 is rotated in a counter-clockwise direction in the direction in the direction of arrows 72,73. Upon rotation of the hub 20 in a counter-clockwise direction, the first flat cable 41 pulls on the first roller 31 at first turned-back loop 43 causing the first roller 31 to rotate. Simultaneously, second conductor cable 42 pulls on second roller 32 at second turned-back loop 44 causing the second roller 32 to rotate in clockwise direction. The pulling of the first cable 41 and the second cable 42 on the first and second rollers 31,32 causes the carrier member 30 to rotate in a counter-clockwise direction. As the hub 20 and carrier member 30 continue to rotate counter-clockwise, the first and second conductors 41,42 are uncoiled from the outer diameter of the chamber 14 and become coiled again onto the hub 20. It can be seen that in the completely unwound position, the coils are positioned along the outer diameter of the chamber 14 in a first layer 81, a second layer 82, a third layer 83, and a fourth layer 84. The first conductor cable 41 and the second conductor cable 42 are alternatingly layered; wherein first layer 81 and third layer 83 are the first conductor cable 41 and the second layer 82 and fourth layer 84 are the second conductor cable 42. Upon the first rotation of the hub 20 in the counter-clockwise direction, layer 81 is taken up from the outer diameter of the chamber onto the hub 20 by first roller 31. Simultaneously, second layer 82 is taken up by second roller 32. Upon a second rotation, third layer 83 is taken up by the continued rotation of first roller 31 in the counter-clockwise direction and fourth layer 84 is taken up by second roller 32. This alternating take-up sequence is correspondingly achieved along the inner diameter of the chamber 14 by winding the clockspring connector in the clockwise direction spooling first and second conductor cables 41,42 onto the hub 20.

Figure 4:
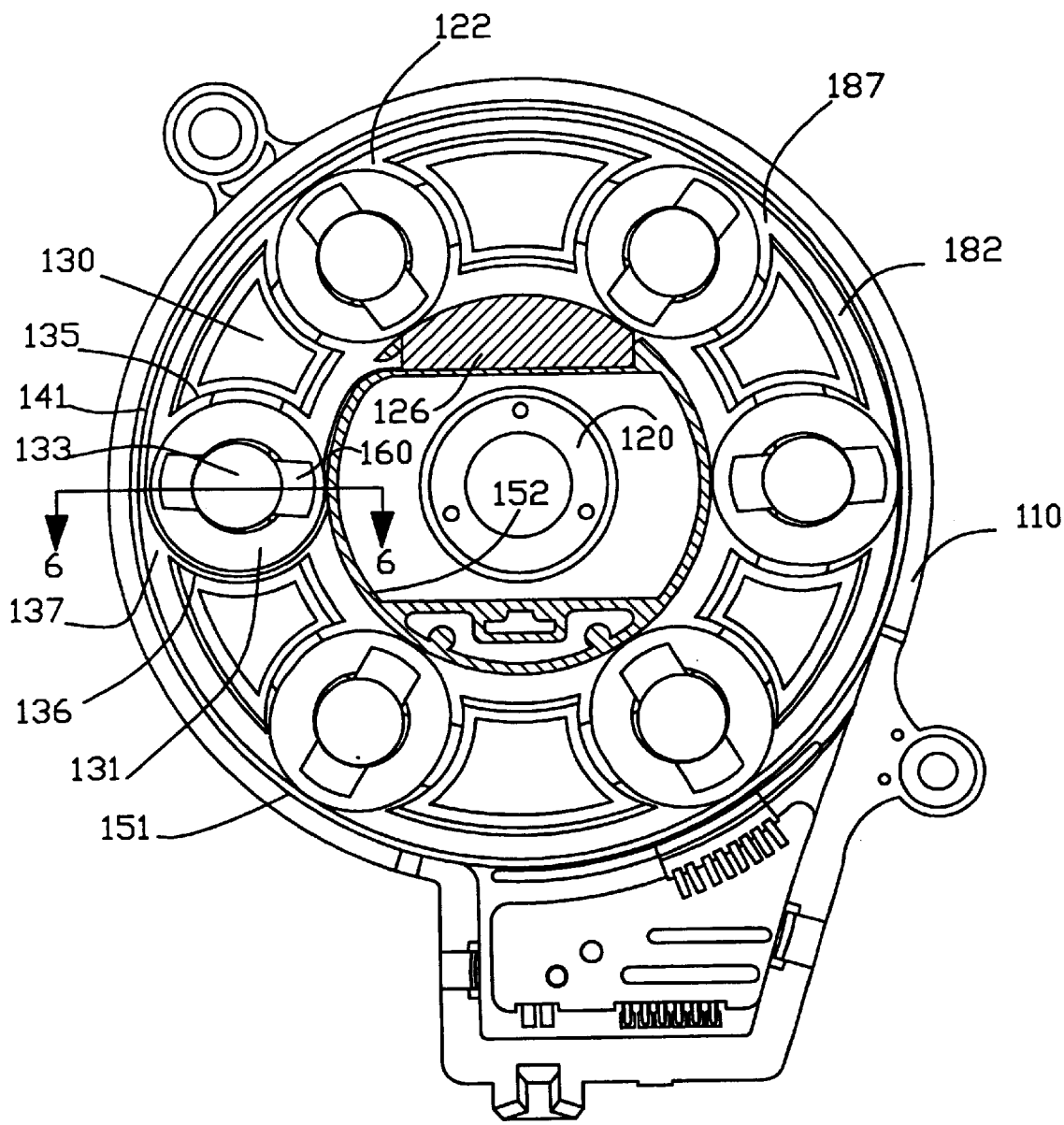
FIG. 4 is a top view of an alternate embodiment of a clockspring connector.

Turning to FIG. 4 an alternate embodiment of the present invention is shown including a housing 110 having a hub 120. Mounted on the hub is a carrier member 130. A first flat conductor cable 141 is carried by the carrier member 130. A cover encloses the carrier member and hub 120 within the housing 110. The housing 110 is constructed of materials which allow the hub 120 to freely rotate within the housing 110 and to reduce the amount of friction between the base 122 of the housing 110. Material such as teflon tape, silicon material or grease may be inserted between the base 122 and the housing 110 in order to reduce the friction at these bearing surfaces. As well, such materials may be used to reduce friction between the carrier member 130 and the housing 110. An inner diameter exit area 126 receives the flat conductor cable 141 and the tape is attached to a backbone (not shown) which connects the flat conductor cable to external electrical wires.

The carrier member 130 is generally a spherically shaped member molded of a thermoplastic polymer material in the presently preferred embodiment. However, any material may be used to form the carrier member 130. The carrier member 130 includes a first roller mounting area 137 and a second roller mounting area 187. In an embodiment the carrier member 130 may include six roller mounting areas and six roller members 131. However, any number of roller mounting areas and rollers are within the scope of the present invention. Axles 133 protrude upwardly from the roller mounting area 137. Roller area walls 135, 136 surround the roller areas 137 and are correspondingly cylindrically shaped to the outer diameter of the roller member 131. The roller member 131 is mounted on axle 133 and is retained on the axle by arm 160. In a preferred embodiment the arm 160 is integrally molded with the axle 133. The arm 160 extends out from the axle beyond the inner-diameter of the roller member 130. In a preferred embodiment the roller member 131 is formed of a compliant material such as rubber or neoprene. The complaint material allows the roller member 131 to maximize the compression forces that are applied against the flat ribbon cable 141 holding the ribbon cable 141 against the outer wall of the chamber 182 and the inner wall of the chamber 42. For example, a rubber O-ring manufactured by Apple Rubber Products, Inc. is used in an embodiment and has durometer measure of 70 and a diameter of 19.5 mm and provides a compression force of 0.15 grams against the flat ribbon cable 141 when the roller member is deformed by less than 20% of its original shape. The diameter of the roller member 131 is approximately equal to the width of the chamber 182±0.100 inch. The width of the chamber is defined by the shortest distance between the inner wall 152 and outer wall 151 of the housing 110.

In another embodiment the roller member 131 maybe formed of a low friction and rigid material at its inner diameter and a high friction and compliant material along its outer diameter. The roller having a multiple composition provides for maximum friction against the flat ribbon cable 141 while allowing for some compression. Having the rigid material at the center of the roller member eliminates the possibility of permanent deformation of the roller member. The roller member 131 rotates freely and independently on the axle 133. The orientation of multiple roller members mounted on the carrier member 130 provides for a continuous compression of the flat ribbon cable against the inner wall 152 and outer wall 151 around the entire diameter of the clockspring housing 110. The roller members 131 have an outer diameter approximately equal to the width between the inner wall 152 and outer wall 151. The roller member 131 in the first roller area 137 also provides the function of a turn back loop in order to guide the flat ribbon cable 141 in a U-shape from the hub 120 through the first roller area 137 and turning back to be guided along the outer wall 151. The embodiment shown in FIG. 4 discloses only a single flat ribbon cable 141. However, in an alternative embodiment the present design may also incorporate multiple flat ribbon cables being carried by the carrier member 130 and the roller members 131.

The clockspring 110 in FIG. 4 is shown in the full counterclockwise position having the flat ribbon cable 141 spooled onto the outer wall 151 of the housing 110. As the hub 120 is rotated in a clockwise direction the flat ribbon cable 141 moves through the first roller area 137 and is coiled onto the inner wall 152 of the hub 120. As the flat ribbon cable 141 moves from being coiled onto the outer wall 151 to the inner wall 152 the thickness of the coil tape on the outer wall 151 is reduced and the thickness of the coiled flat ribbon cable 141 on the inner wall 152 is increased. In other words the gap between the roller member 131 and the inner nd outer walls 151, 152 changes as the flat ribbon cable 141 is spooled from the outer wall 151 to the inner wall 152. Although the gap between the roller member 131 and the walls 151, 152 varies, the compliant roller member 131 maintains a constant compression against the flat ribbon cable 141, regardless of how many layers of the coiled flat ribbon cable are located on either the outer or inner wall 151, 152. This procedure is reversed when the hub 120 is rotated in the counter-clockwise direction.

Figure 5:
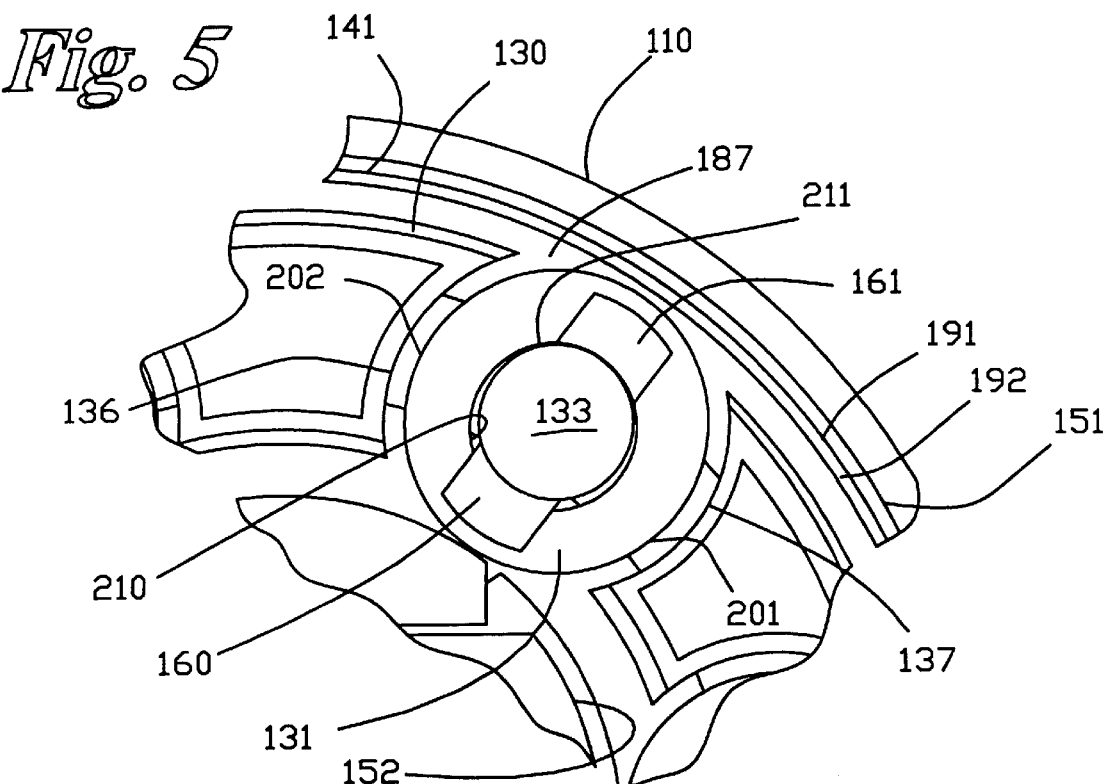
FIG. 5. is an enlarged view of a compliant roller member of FIG. 4.

Turning to FIG. 5, an enlarged view of second roller area 187 is shown. The roller member 131 is mounted on axle 133 and is maintained thereon by arms 160, 161. The roller member 131 is mounted on carrier member 130 which is mounted within the housing 110 of the clockspring between the outer wall 151 and inner wall 152. The flat ribbon cable 141 is shown having a first layer 191 and a second layer 192 coiled against the outer wall 151 of the housing 110. The two coiled layers 191 and 192 of the flat ribbon cable 141 cause the roller member 131 to compress and form an ovoid shape where the diameter of the roller member 131 where it contacts the inner and outer walls 151, 152 is less than the diameter of the roller member 131 at points 201 and 202 where the roller member 131 is adjacent the roller area walls 136, 137. The roller member 131 is also offset toward the inner wall 152 so that the inner diameter of the roller member 131 forms a first gap 210 between the inner diameter of the roller member 131 and the axle 133 that is greater than a second gap 211 formed between the inner diameter of the roller member and the axle 133. In a preferred embodiment the roller member 131 includes an inner diameter radius that is larger than the radius of the axle 133, so that such an offset condition may be achieved. Consequently, when the hub is rotated and the flat ribbon cable 141 is coiled on the inner wall 152 the roller member 131 will be offset in the other direction toward the outer wall 151 and the first gap 210 will be less than the second gap 211. As well, the ovoid shape of the carrier member 131 will be maintained in order to continue to provide compression of the roller member 131 against the flat ribbon cable 141 coiled onto the inner wall 152 of the housing 110. Therefore, it may be understood throughout the entire rotation of the hub and the winding and the unwinding of the flat ribbon cable 141 a constant pressure will be applied against the flat ribbon cable 141 compressing it against either the inner 152 or outer 151 wall of the housing 110. This improved system provides for a quiet clockspring operation which avoids vibrations of the flat ribbon cable 141 that cause noise.

Figure 6:
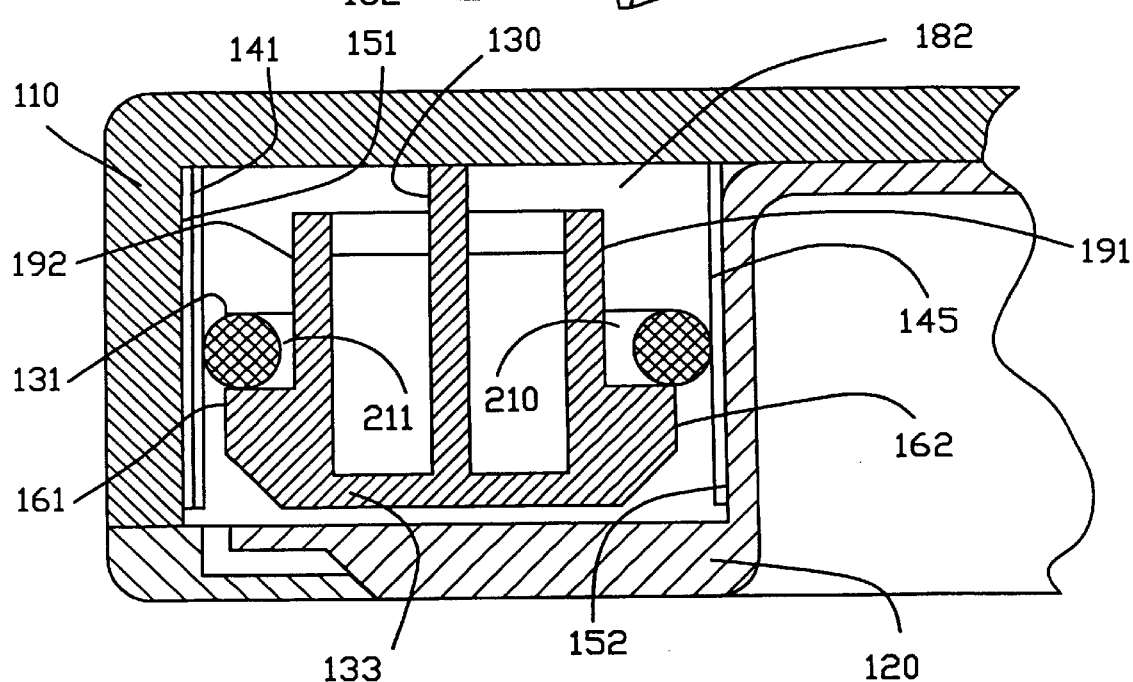
FIG. 6 is a side cut-away view of the clockspring connector of FIG. 4 taken at line 6—6.

Turning to FIG. 6 a side elevation cut-away view of FIG. 4 taken at line 6—6 is shown. The housing 110 is shown having hub 120 mounted thereon forming a cavity 182 in which the carrier member 130 is mounted. Roller member 131 is mounted on axle 133 and maintained thereon by arms 161, 162. As the clockspring is in its full counter-clockwise position, multiple layers of the flat ribbon cable 141 are coiled along outer wall 151 and a single coil of the flat ribbon cable 145 is located along inner wall 152 of the housing 110. In this orientation it can be seen that the first gap 210 between the inner diameter of the roller member 131 and the outer diameter of a first side 191 the axle 133 is greater than the second gap 211 on the opposed second side 192 of the axle 133. As discussed above, the roller member 131 being formed of a compliant material provides for the roller member 131 providing a constant compression force against the flat ribbon cable 141, 145 throughout the unwinding and winding of the flat ribbon cable onto the inner wall 151 to the outer wall 151 of the clockspring housing 110.

It can be seen from the present invention that two flat conductor cables can be easily wound with minimal components incorporated within the clockspring housing and with minimal length of flat conductor cable.

Figure 7:
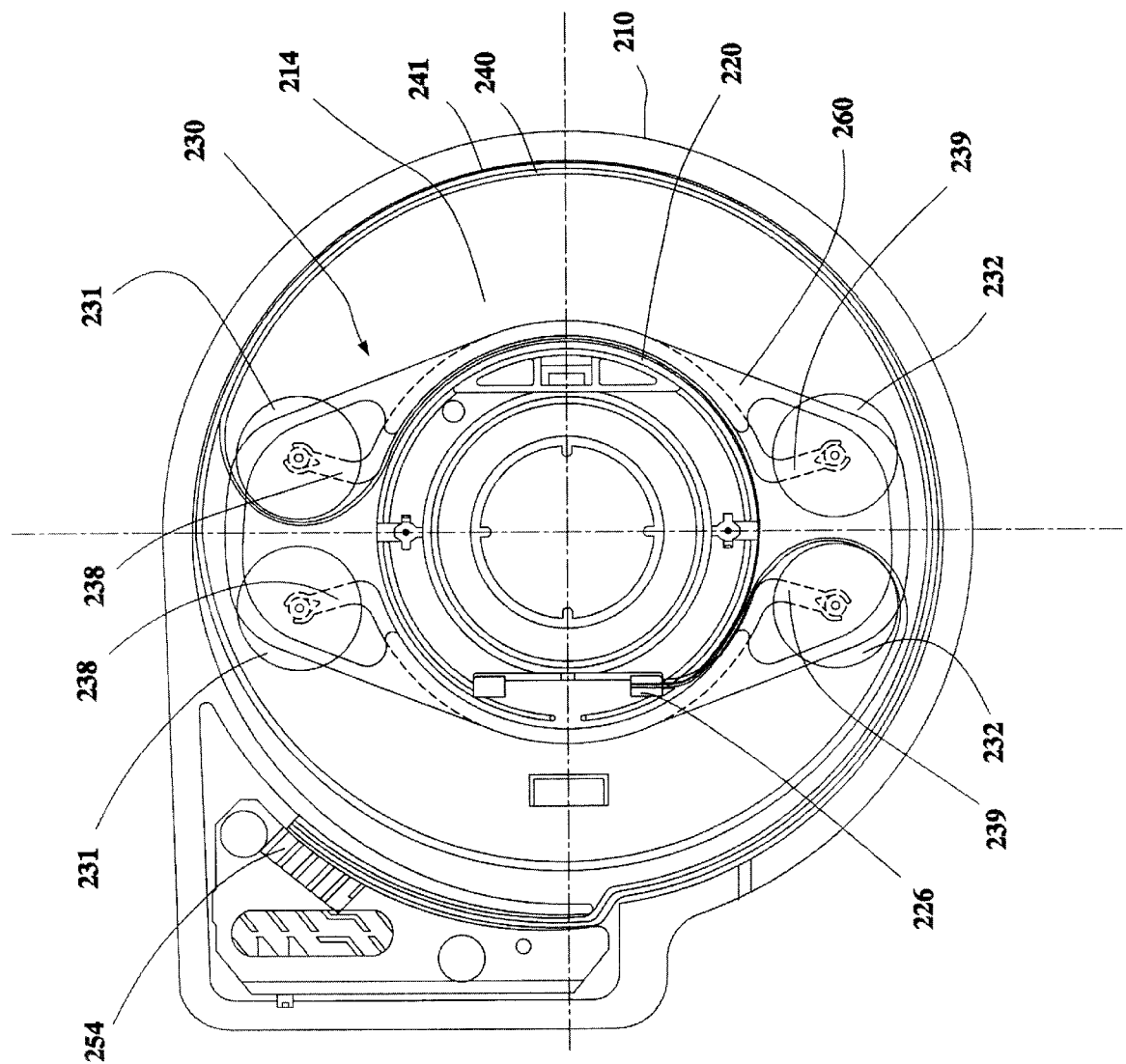
FIG. 7 is a top view of a clockspring embodiment of an alternative integrated carrier assembly in the unwound position.

In still another preferred embodiment, FIG. 7 shows an integrated carrier assembly 230 for employing rotatably mounted rollers to guide one or more flat ribbon cables. The integrated carrier assembly 230 differs from previous embodiments in that it includes pre-assembled components integrated as one unit for assembly purposes. As will be described in greater detail, the integrated carrier assembly 230 of the preferred embodiment includes a frame 260 with rollers or roller assemblies mounted thereto. As with previous embodiments, the integrated carrier assembly 230 resides with a chamber 214 defined by the clockspring housing 210. The preferred integrated carrier assembly 230 includes a frame 260 having pairs of rollers for guiding the flat ribbon cables thereto. In general, the integrated carrier assembly 230 operates in similar fashion to previous clocksprings described herein. Accordingly, FIG. 7 shows that the integrated carrier assembly 230 rotatably mounts to the hub 220, with the cover 250 fixedly mounted over the housing 210 to enclose the hub 220 and integrated carrier assembly 230. The housing 210 is also constructed of materials which allow the hub 220 to freely rotate therein in a manner that reduces friction between the base (shown as numeral 22 in FIG. 1) and housing 210. To this end, materials such as Teflon tape, silicon material or conventional grease may be injected between the base 222 and the housing 210. In similar fashion, the integrated carrier assembly 230 is rotatably secured to the housing 210 on the hub 220.

With further reference to FIG. 7, the frame 260 surrounds the hub 220 and supports a plurality of rotatably attached rollers that maintain a guiding presence on the flat ribbon cables 240, 241. The frame 260 is oblong and contoured to extend across the chamber 214, with one or more roller assemblies employing rollers that guide the flat ribbon cables 240, 241. In the preferred embodiment, a first and second pair of rollers 231, 231 and 232, 232 oppose one another across the frame 260, with each pair of rollers comprising two adjacent rollers. However, it should be readily apparent to one skilled in the art that more or less rollers may be used in similar or alternative arrangements. The rollers are rotatably secured to the frame 260 by corresponding first and second connector forks 238, 238 and 239, 239 that unitarily extend from the frame 260 and engage each roller 231 and 232 about the axle to allow free rotation. For reference, an inner diameter region may be defined as the concentric area between the integrated carrier assembly 230 and hub 220, while the outer diameter region is defined as the concentric area between the housing 210 and integrated carrier assembly 230. The rollers 231, 232 spool the flat ribbon cables 240, 241 from the inner diameter region to the outer diameter region and thereback. Preferably, the rollers comprise solid plastic, but may also include compliant rollers discussed elsewhere in this application may be substituted in this embodiment.

As with previous embodiments, the flat ribbon cables 240, 241 electrically connect two conductive backbones or conductive surfaces within the housing, where the first backbone is received by the base and is rotatable therewith to transmit the motion of the steering wheel. For purposes of this particular embodiment, the ribbon cables 240, 241 connect the inner diameter backbone 226 with the outer diameter backbone 254, in a manner described with previous embodiments herein. Each flat ribbon cable 240, 241 is distributed to include a portion within the inner and outer diameters, where each flat ribbon may pass and turn-back through the roller assemblies 231, 232 to distribute their respective lengths between the inner and outer diameters. In this way, when the flat ribbon cables 240, 241 distribute upon rotation of the inner backbone 226, the portions of the respective flat ribbon cables 240, 241 within the inner and outer diameter each move in opposite directions with respect to one another. Each flat ribbon cable 240, 241 may also have a slack portion that is variable with rotation of the inner backbone 226, and is defined approximately to be the cable length positioned at any given moment between the rollers of each roller assembly 231, 232. With rotation of the inner backbone 226, the flat ribbon cables 240, 241 increasingly distribute between the inner or outer diameter region, depending on whether the clockspring is being wound or unwound. FIG. 7 shows in greater detail one preferred configuration of the clockspring, with the flat ribbon cables 240, 241 in the unwound position such that the amount of each flat ribbon cable 240, 241 is maximized along the outer diameter region.

Since the arrangement of flat ribbon cables 240, 241 may equally be shared between the inner and outer diameter regions, the invention will be described with reference to the wound position depicted in FIG. 7. It should be apparent to one skilled in the art that the distribution and motion of the flat ribbon cable 240, 241 from the wound to the unwound position is substantially similar or equivalent to FIGS. 2 and 3 and the accompanying text. This embodiment varies from previous embodiments by providing an improved mechanism for guiding and supporting one or more flat ribbon cables within the housing. Accordingly, FIG. 7 shows that each flat ribbon cables 240, 241 may interconnect with the inner backbone 226 to partially encircle the hub 220 along the inner diameter. Both flat ribbon cables 240, 241 interconnect with the inner backbone 226, and extend to and encircle about the outer diameter from opposing ends of the frame 260. As such, the flat ribbon cable 241 is shown to be longer than the other cable to provide for the extra length needed to encircle the hub 220 an extra 180 degrees.

As with previous embodiments, rotation of the steering wheel allows the inner backbone 226 to force the flat ribbon cables 240, 241 to variably distribute among the inner or outer diameter regions. With respect to the embodiment of FIG. 7, the steering wheel may be rotated in the clockwise direction to wind the flat ribbon cables 240, 241 about the hub 220. The winding motion forces the excess flat ribbon cables 240, 241 through the respective pair of rollers 231, 231, and 232, 232. In general, each flat ribbon cable 240, 241 slackens as it passes through the respective rollers 231, 231 and 232, 232. The slack length in turn forcibly engages the roller pairs and thereby provides a reactive force that rotates the carrier member 230 in conjunction with the rotation of the inner backbone 226. In this way, the motion of the carrier member 230 positions the rollers 231, 231, and 232, 232 to intake the flat ribbon cable from the outer diameter region, so that the flat ribbon cables 240, 241 cannot pinch or radially pull inwards with successive rotations of the inner backbone. In this way, the flat ribbon cables 240, 241 may be fully wound from the unwound position about the hub 220, such that all excess cable resides in the inner diameter region.

It should be apparent to one skilled in the art that while the flat ribbon cables 240, 241 are preferably slack when passing through the respective rollers 231, 232, a taught engagement between the rollers and flat ribbon cables 240, 241 is also contemplated. In a taught engagement, each flat ribbon cable 240, 241 pulls one of the rollers in the pair of rollers 31,232 as it passes from the outer to the inner diameter region, with little excess slack forming between the rollers. The pulling motion of the flat ribbon cables 240, 241 through the rollers 231 and 232 also causes the reactive force that rotates the integrated carrier assembly 230 in conjunction with the intake of flat ribbon cables.

Based on the configuration of FIG. 7, the flat ribbon cables 240, 241 unwind from the inner diameter when the inner backbone 226 is rotated in the counterclockwise direction. The counterclockwise rotation of the clockspring pushes the flat ribbon cables 240, 241 to unwind from the inside to the outside diameter regions. The unwinding rotation causes the flat ribbon cables 240, 241 to slack while passing through rollers 231, 231 and 232, 232. In turn, the pushing motion of the flat ribbon cables 240, 241 causes the respective slack lengths to combine and forcibly contact the roller pairs and/or the integrated carrier assembly 230, thereby rotating the integrated carrier assembly 230 in the counterclockwise motion. In this way, the inner backbone 226 may be rotated in the clockwise or counter clockwise direction to variably distribute the excess length of each flat ribbon cable 240, 241 to and from the inner and outer diameter regions.

As with previous embodiments, this embodiment provides for the flat ribbon cables 240, 241 to radially compress and reduce the sliding friction that cause noise. However, this embodiment provides one significant improvement over the prior art in that it provides for the flat ribbon cables 240, 241 to compress only within the inner diameter region. As such, this embodiment avoids the creation of folds and fracture points that tend to form when the flat ribbon cables are comprised along the outer diameter region. More specifically, the flat ribbon cables 240, 241 are confined within the small concentric space between the frame 260 and hub 220, which allows the flat ribbon cables 240, 241 to compress against one another and the frame/hub within the inner diameter region. In this manner, the invention reduces the amount of noise that often results from transferring the flat ribbon cables 240, 241 between the inner and outer diameter regions.

A method of assembling the clockspring of this invention is also provided for this embodiment. The method includes providing a housing having a fixed cover and a rotatable base, the housing receiving a first and second conductive backbone, the first conductive backbone received by the base to be rotatable therewith and with the steering system. In addition, the method includes rotatably mounting the hub 220 to the housing 210 to be freely rotatable with respect to the housing, and rotatably mounting the integrated carrier assembly 230 to be freely rotatable with respect to the hub 220 and the housing 210. The method of further includes distributing the first flat ribbon cable 240 in the housing 210 to interconnect the first and second backbone so that a portion of the first flat ribbon cable is distributed in the region between the frame and the hub, and another portion of the flat ribbon cable is distributed between the housing and the frame. The method may also include distributing a second flat ribbon cable 241 in substantially similar fashion, and for compressing the first and second flat ribbon cable 240, 241 against the hub with the frame 260. The flat ribbon cables may be compressed by dimensioning the frame 260 with respect to the hub 220 to provide for the inner diameter region therebetween to be sufficiently narrow to compress each flat ribbon cable. Finally, the method of assembly may provide for securing the assembled clockspring to a steering system in a manner known and practiced in the art.

While this embodiment preferably employs a design with two flat ribbon cables, it should be readily apparent to one skilled in the art that the integrated carrier assembly 230 may accommodate a single flat ribbon cables design by providing only one pair of rollers. Likewise, additional roller pairs may be employed to incorporate three or more flat ribbon cables in the clockspring. The use of more or less flat ribbon cables is generally dictated by the number of closed circuits required within the steering wheel, and not by limitations of this invention.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

What is claimed is:

1. A clockspring connector comprising:

a clockspring housing having a rotatable hub and a fixed cover, said housing receiving a first and a second conductive backbone, the first conductive backbone received by the hub and rotatable therewith;

an integrated carrier assembly having a frame with a first and a second roller assembly, the integrated carrier assembly rotatably mounted to the hub, each roller assembly including a first and a second adjacent roller in proximity to one another, each roller of the first and the second roller assembly being rotatably mounted to the frame;

an inner diameter region concentrically defined within the housing by the hub and the frame;

an outer diameter region concentrically defined within the housing by the frame and the housing;

a first flat ribbon cable coiled within the housing to distribute a portion between the inner and outer diameter regions, the portion of the first flat ribbon cable passing and turning-back through the first roller assembly to interconnect the first and the second backbone, the portion of the first flat ribbon cable having a concave surface on one side of the first flat ribbon cable and a convex surface on another side of the first flat ribbon cable, the concave surface of the portion facing the first adjacent roller of the first roller assembly, and the convex surface of the portion facing the second adjacent roller of the first roller assembly;

a second flat ribbon cable coiled within the housing to distribute a portion between the inner and outer diameter regions, the portion of the second flat ribbon cable passing and turning-back through the second roller assembly to interconnect the first and the second backbone, the portion of the second flat ribbon cable having a concave surface on one side of the second flat ribbon cable and a convex surface on another side of the second flat ribbon cable, the concave surface of the portion facing the first adjacent roller of the second roller assembly, and the convex surface of the portion facing the second adjacent roller of the second roller assembly;

wherein when the inner backbone is rotated in a first direction, the concave surfaces of the first and second flat ribbon cables contact and rotate the first adjacent rollers of the first and the second roller assembly of the integrated carrier assembly, respectively, in the first direction; and wherein when the inner diameter backbone is rotated in a second direction, the second direction being opposite to the first direction, the convex surfaces of the first and second flat ribbon cables contact and rotate the second adjacent rollers of the first and the second roller assembly of the integrated carrier assembly, respectively, in the second direction.

2. The clockspring of claim 1, wherein the frame is dimensioned so that the portions of the first and second flat ribbon cables within the inner diameter regions are compressed towards the hub.

3. The clockspring of claim 2, wherein the integrated carrier assembly is freely rotatable with respect to the hub.

4. The clockspring of claim 3, wherein each roller is connected to the frame by a corresponding connector fork unitarily extending therefrom.

5. The clockspring of claim 1, wherein when the first backbone rotates, the first and second flat ribbon cable form a slack length between the adjacent rollers of the respective first and second roller assemblies so that the slack length contact either of the adjacent rollers of the respective roller assemblies to rotate the integrated carrier assembly.

* * * * *